United States Patent [19]

Gordon et al.

[11] 4,177,552

[45] Dec. 11, 1979

[54] METHOD OF MAKING LAMINAR BATTERIES

[75] Inventors: Michael E. Gordon, Wayland; Frank Stieger, Newton Highland, both of Mass.

[73] Assignee: Polaroid Corporation, Cambridge, Mass.

[21] Appl. No.: 918,780

[22] Filed: Jun. 26, 1978

Related U.S. Application Data

[62] Division of Ser. No. 852,919, Nov. 18, 1977, abandoned.

[51] Int. Cl.$^2$ .................. H01M 6/00; H01M 6/46
[52] U.S. Cl. .................. 29/623.4; 429/152
[58] Field of Search ........... 29/623.4, 623.2, 623.3; 429/152, 153, 154, 162, 163, 185

[56] References Cited

U.S. PATENT DOCUMENTS

| | | | |
|---|---|---|---|
| 3,907,599 | 9/1975 | Fanciullo et al. | 429/152 |
| 3,912,543 | 10/1975 | Delahunt | 429/153 |
| 4,019,251 | 4/1977 | McCole | 29/623.2 |
| 4,098,965 | 7/1978 | Kinsman | 429/153 |
| 4,105,831 | 8/1978 | Plasse | 429/162 |
| 4,119,770 | 10/1978 | Land | 429/152 |
| 4,125,683 | 11/1978 | Bloom et al. | 429/152 |

Primary Examiner—Francis S. Husar
Assistant Examiner—Daniel C. Crane
Attorney, Agent, or Firm—John W. Ericson

[57] ABSTRACT

Thin flat electrical cells and batteries comprising frames formed with a central opening for receiving wet electrical cell components and made from a two layered structure of a high melting thermoplastic material and a lower melting thermoplastic material, and methods of making the same.

2 Claims, 5 Drawing Figures

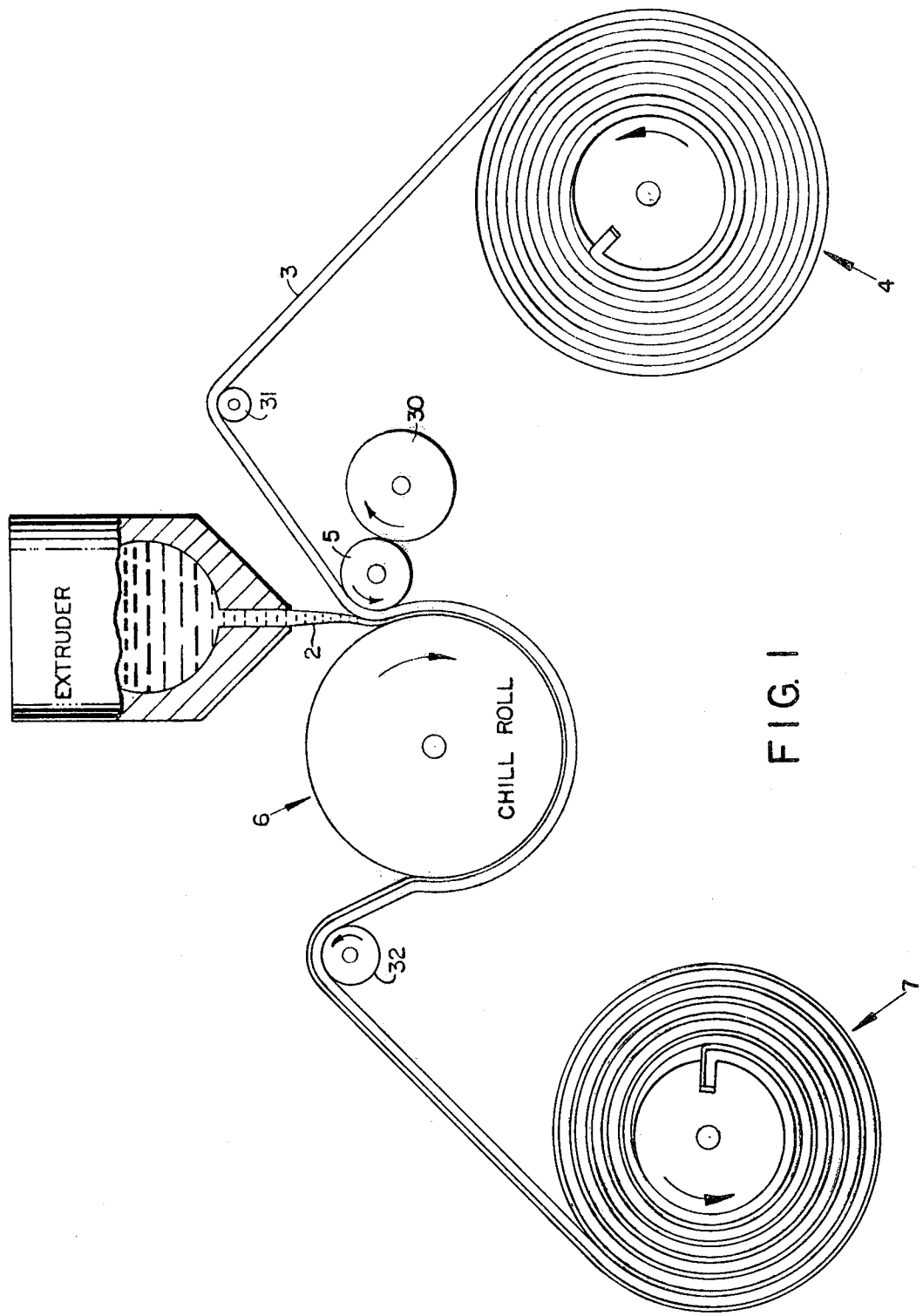

METHOD OF MAKING LAMINAR BATTERIES

This is a division of application Ser. No. 852,919, filed Nov. 18, 1977, now abandoned.

This invention relates to electrical cells and batteries, and particularly to novel laminar cells and batteries and methods of making the same.

Thin flat laminar batteries are commonly made with cells separated and electrically connected together by conductive plastic intercell connectors. The cells are completed by liquid impervious borders formed by sealing the inner edges of the intercell connectors to and between liquid impervious frame elements. One approach to the manufacture of batteries of this kind is to make the frame elements integral with the separators by filling the borders of liquid permeable separator material with a liquid impermeable heat activatable adhesive. Such a construction is shown and described in U.S. Pat. No. 4,019,251, issued on Apr. 26, 1977 to Thomas P. McCole for Flat Battery and Method of Manufacture, and assigned to assignee of this application.

In another construction, shown and described in U.S. Pat. No. 3,907,599, issued on Sept. 23, 1975 to Ralph D. Fanciullo and Ludwig G. Fasalino for Flat Battery, and assigned to the assignee of this application, the frames are made of vinyl sealed to the borders of the intercell connectors and current collectors and sealed to themselves to form a liquid tight peripheral seal around the battery.

A third form of construction is shown in Copending U.S. application For Letters Patent Ser. No. 761,651, filed on Jan. 24, 1977 by Edwin H. Land for Electrical Cells and Batteries and assigned to the assignee of this application. In application U.S. Pat. No. 4,119,770, frames of thermpolastic hot melt adhesive material are described to which cellophane separators are adhered. Conductive plastic intercell connectors extend between and are bonded to the frames, and the terminal current collectors are similarly bonded to the frames by application of heat and pressure. A method of making batteries of the kind described in U.S. Pat. No. 4,119,770 is described in U.S. application Ser. No. 761652, filed on Jan. 24, 1977 by Gordon F. Kinsman for Flat Batteries and Method of Making the Same and assigned to the assignee of this application now abandoned.

In the manufacture of batteries of the type described above, care must be taken in the sealing process to avoid combinations of heat and pressure that would cause the materials being sealed to flow out of position instead of simply being softened and adhesively bonded as desired. This is particularly true when it is desired to seal pieces of the same material together, as in the vinyl-to-vinyl seals described in U.S. Pat. No. 3,907,599 cited above.

One object of this invention is to reduce the tendency of the materials to flow during sealing in the manufacture of laminar batteries.

Another sealing problem that has been encountered, particularly with batteries of the kind described in U.S. Pat. No. 4,119,770 cited above, arises from the use of the combination of a wet slurry cathode, gel electrolyte, and a cellophane separator. As noted above and more fully described in application Ser. No. 761,652, cited above, the cellophane separators are initially heat sealed to the thermoplastic frames to facilitate assembly. When a multiple cell battery is assembled from these components, it is difficult to keep the components, particularly the slurry cathode and gel electrolyte, in position as the components are assembled and before they are sealed. This problem can be solved with difficulty by forming the seals one at a time as the components are put in place. The difficulty is that a frame material which will adhere to cellophane also has a strong tendency to adhere to the sealing platens. Another object of this invention is therefore to facilitate the step by step sealing of laminar batteries. A further object of the invention is to facilitate the sealing of batteries with very thick frames, or with many cells.

Briefly, the above and other objects of the invention are attained by a combination of structures and methods organized about the use of a frame formed as a two part laminate of a first thermoplastic material that can be softened over a relatively high temperature range with a second thermoplastic material that can be adhered to cellophane and softens over a range substantially below that of the first material. A central opening is formed in the laminated frame to receive cell components, and a cellophane separator is adhered by heat and pressure to the adhesive side of the frame.

The manufacture of batteries in accordance with the invention preferably is carried out on a carrier sheet to which have been adhered a series of discrete cathode collector assemblies in the manner described in detail in above cited U.S. Pat. No. 4,019,251, which is hereby incorporated herein by reference. Each of the cathode collector assemblies comprises a metal foil cathode terminal adhered to the carrier sheet and a conductive plastic current collector adhered to the metal terminal sheet.

As the process of the invention is applied sequentially to each cathode collector assembly in turn, attention will be focused on a typical one of them. On the conductive plastic surface of such a typical cathode collector assembly, there is first extruded a wet slurry cathode in the manner described in the above cited U.S. application Ser. No. 761,652. A composite framed separator as described above is then placed down on the cathode subassembly, with the cellophane separator in contact with and extending beyond the borders of the cathode slurry, and the low temperature range thermoplastic in contact with the conductive plastic face of the cathode collector assembly. A layer of gel electrolyte is then extruded into the pocket formed by the opening in the frame above the cellophane separator. Next, a conductive plastic intercell connector on which a zinc anode has been formed is placed with the zinc in registry and in contact with the gel electrolyte and the intercell connector engaging the high range softening side of the frame. Then heat and pressure is applied to the frame sufficiently to activate the low temperature adhesive side and bond the frame to the conductive plastic current collector. Next, the conductive plastic intercell connector is sealed to the frame. Operation thereafter is essentially repetitive, commencing with the extrusion of a second cathode slurry over the intercell connector.

The apparatus and method of the invention will best be understood by reference to the following detailed description, together with accompanying illustrative drawings.

In the drawings;

FIG. 1 is a schematic diagram of a presently preferred process for making a laminate for use in the invention;

Figure 5:
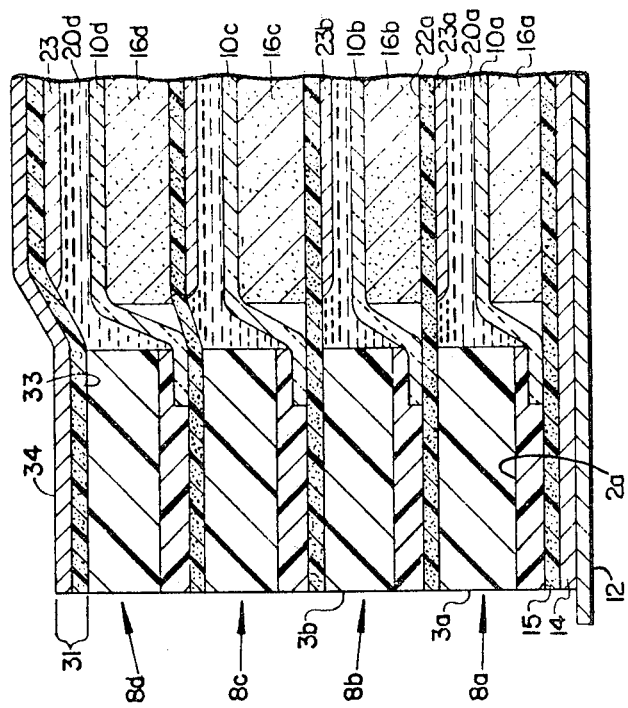
FIG. 5 is a fragmentary schematic sketch, on an enlarged scale and with vertical dimensions exaggerated, illustrating the internal construction of the battery of FIG. 4 as seen essentially along the lines 5—5 in FIG. 4.

FIG. 1 illustrates a presently preferred mode of the preparation of a laminate for use in the invention. As shown, a conventional extruder provided with a flat film die 1 extrudes a curtain of hot molten thermoplastic material 2 through the die onto a web of material 3 drawn from suitable source shown as a supply roll 4. An intermediate roll 31 maintains the angle at which the sheet 3 approaches the roll 5 as the diameter of the supply roll 4 changes. The joining of the thermoplastic material 2 to the thermoplastic material 3 occurs at, or just before, the ingoing nip of a driven chill roll 6 and a compliant rubber covered rubber roll 5. A backup roll 30 provides cooling and mechanical pressure backup to the rubber roll 5.

The chill roll 6 is cooled in a conventional manner, not shown, as by recirculated cooled water, so that as the laminate advances around the periphery of the roll 6 in a clockwise sense as seen in FIG. 1, the thermoplastic layers 2 and 3 are sufficiently cooled and toughened so that the laminate can be stripped from the chill roll 6 by a stripper roll 32. The freed web of the laminate procedes from the stripper roll 32 to a driven windup roll 7.

Stripping of the thermoplastic layer 2 from the chill roll 6 requires that the interface be cool to reduce its adhesion. To aid in releasing the laminate, the chill roll 6 is preferably provided with a chrome plated matte surface.

The thermoplastic material from which the sheet 3 is made is chosen to be relatively dimensionally stable under the conditions of temperature and pressure at which the layer 2 flows. It should of course be chemically inert to the electrochemical system in which it will be installed, and be capable of adhesion to the conductive intercell connectors to be described, and to the thermoplastic layer 2. Numerous conventional thermoplastic materials will occur to the artisan as meeting these requirements. A currently preferred material is rigid vinyl sheeting, such as a polyvinyl chloride homopolymer, or a copolymer, such as a copolymer of vinyl chloride and vinyl acetate made from 4 to 15 percent by weight of vinyl acetate and 96 to 85 percent by weight of vinyl chloride, based on the weight of copolymer. Typically, commonally available vinyl sheeting materials also contain conventional impact modifiers, stabilizers and lubricants. These vinyl sheeting materials soften in the neighborhood of 360° F. under moderate pressures. As another specific example of a suitable material, mention may be made of Surlyn A.

The thermoplastic material 2 is preferably one that softens under considerably lower temperatures, such as a polyamide hot melt adhesive for which softening temperatures are in the range of 200°-330° F. Ethylene vinly acetate and other similar materials that will occur to the artisan may also be employed. It will be understood by those skilled in the art that the flow and adhesive behavior of thermoplastic materials is a function of pressure and time as well as temperature, so that the exact temperatures attained during a given sealing process are not critical, and in fact may vary over a considerable range. The significant point in the selection of the materials for the layers 2 and 3 is that the layer 2 should soften and flow under conditions of temperature and pressure considerably lower than required to soften the sheet 3. In practice, it is preferred to make the sheet 3 two to three times as thick as the layer 2; for example, in accordance with one practice of the invention the sheet 3 was made of American Hoechst vinyl sheeting D 18C 8A, 8 mils in thickness, and the layer 2 was made of Versalon 1140 hot melt adhesive resin as made and sold by General Mills, Inc. of Minneapolis, Minn., coated two to three mils in thickness.

Figure 2:
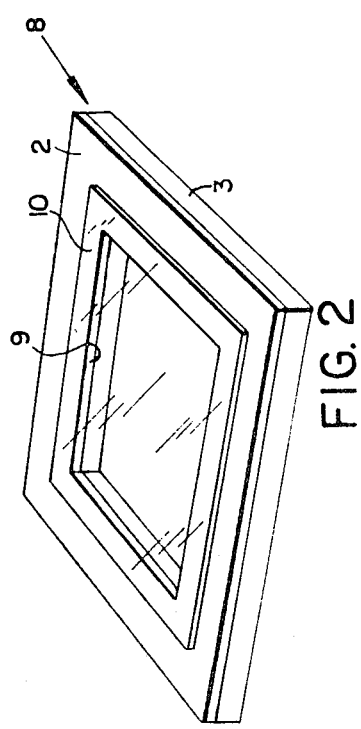
FIG. 2 is a schematic perspective sketch of a framed cellophane separator in accordance with the invention.

The cooled laminate is formed into frames such as 8 in FIG. 2, as by die cutting an aperture 9 through each such frame, and cutting the sheet into rectangular pieces. A cellophane separator 10 is then adhered to the adhesive side 2 of the laminated frame 8, as by heat and pressure or the like. If desired, the cellophane may be applied over the apertures before the laminate is cut into frames. The sheet 10 may be, for example, of PUDO cellophane 1.34 mils in thickness, as made and sold by E. I. duPont deNemours & Co. of Wilmington, Del. In view of the adhesive nature of the layer 2 of the frame, it will be apparent that many other conventional separator materials could be employed, such as those described for example, in the above cited U.S. Pat. No. 4,019,251.

The invention can be practiced in the manufacture of batteries using any conventional acid or alkaline electrochemical system, it only being necessary that the thermoplastic materials chosen for the frame such as 8 be chemically inert in the system chosen. The presently preferred embodiments include zinc anodes, manganese dioxide cathodes, and an electrolyte of either potassium hydroxide or of mixtures of ammonium chloride and zinc chloride. Specific compositions that are especially suitable for use in the practice of the invention are those described in detail in U.S. application Ser. No. 761,651, cited above, which is incorporated herein by reference. For simplicity and clarity of the following description, the invention will be described with reference to the latter system. However, it should be understood that the invention may be carried out in the manufacture of any laminar battery employing thermoplastic frames regardless of the electrochemical system employed.

Figure 3:
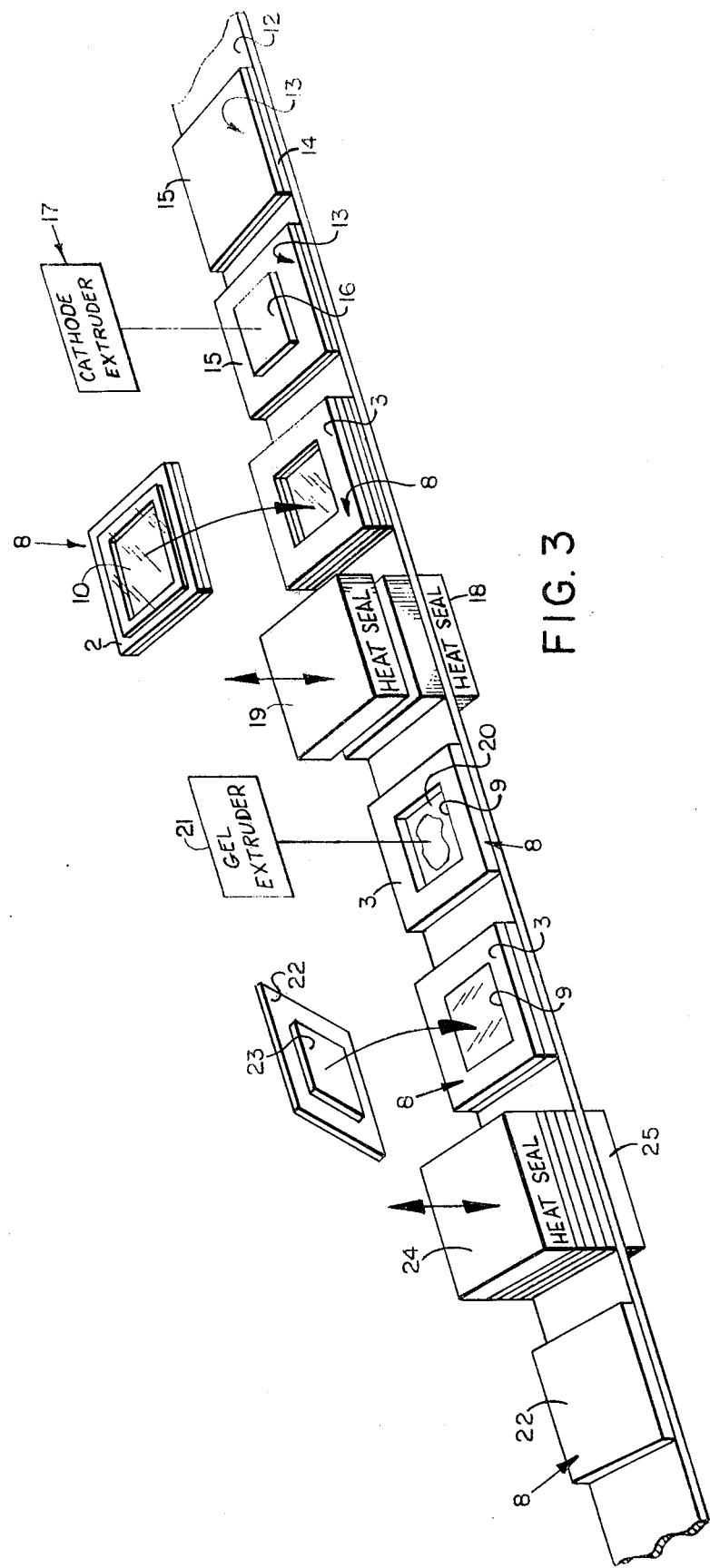
FIG. 3 is a fragmentary schematic perspective sketch illustrating typical steps in the process of forming a battery in accordance with the invention.

Referring to FIG. 3, typical steps in the manufacture of batteries in accordance with the invention are shown. It is preferred to carry out the process on an electrically insulative carrier web 12, such as described in detail in the above cited U.S. Pat. No. 4,019,251, to act as a carrier to move the components of the batteries through the various stages of manufacture as they are assembled.

Various operations are illustrated for conciseness as being carried out immediately followed by the previous operation. It will be understood that this is done merely to illustrate the sequence of operations, and that more space between operations would generally be required in practice.

As shown, the sheet 12 has prelaminated thereto a series of cathode collector assemblies such as 13. As best shown for the cathode collector 13 at the right in FIG. 3, each cathode collector assembly comprises a thin metal terminal 14 laminated between the carrier web 12 and a sheet 15 of conductive plastic, such as Condulon film as made by Pervel Industries, a vinyl film made conductive by the inclusion of carbon black.

On each of the conductive plastic cathode current collectors 15 is first extruded a cathode slurry electrode 16 by means schematically indicated as a cathode extruder 17. Next, one of the frames 8 with a pre-attached separator 10 is placed down over the current collector and cathode with the cellophane separator 10 engaging the cathode and the adhesive side 2 of the frame 8 engaging the conductive plastic 15.

Next, the frame 8 just added is heat sealed to the conductive plastic by heated platens schematically indicated at 18 and 19, as in the manner more fully shown and described in the above cited U.S. Pat. No. 4,019,251, under conditions of temperature and pressure selected to cause the activation of the adhesive of the layer 2 to bond the frame 8 to the cathode terminal assembly. Following sealing, the platens 18 and 19 are separated. If desired, the heating operation may be followed by cooling operations as described in U.S. Pat. No. 4,019,251. The final seal of the components present may be effected this time, but in general it is preferred simply to make the seal sufficient to keep the parts in position and to make the final seal after all of the components are in place.

Next, a layer of gel electrolyte 20 is extruded into the pocket defined by the opening 9 in the frame 8 above the cellophane, as by a gel extruder schematically shown at 21.

To the assembly produced as just described is added an intercell assembly comprising a sheet 22 of conductive plastic on which there has been preformed an anode 23, such as a dry patch zinc anode of the kind described in the above cited application Ser. No. 761,651. This anode 23 is made to correspond in shape with the aperture in the frame 8, and is placed down in contact with the gel electrolyte 20 with the conductive plastic 22 engaging the high melting side 3 of the frame 8. This assembly is now heat sealed in the manner generally described above by platens schematically indicated at 24 and 25, preferably with the platen 24 heated and the platen 25 not heated so that the heat enters primarily through the thin conductive plastic intercell connector 22. This sealing operation will in general take place at a higher temperature than the first sealing operation. For example, if the sheet 3 is of the Hoechst vinyl material described, and the conductive plastic layer 22 is of Condulon conductive vinyl film, the Condulon film will soften under conditions of pressure and temperature somewhat below those at which the sheet 3 will soften, so that the primary adhesion mechanism depends on the softening of the conductive plastic to adhere it to the vinyl sheet 3. As typical sealing conditions, mention may be made of a 0.8 second dwell with the platens 24 and 25 exerting a pressure of approximately 18 pounds per square inch on the components, with the upper platen 24 at approximately 500° F.

Subsequent operations are primarily repetitive of those just described, beginning with another cathode layer 16 being extruded onto the surface of the conductive plastic intercell connector 22.

Figure 4:
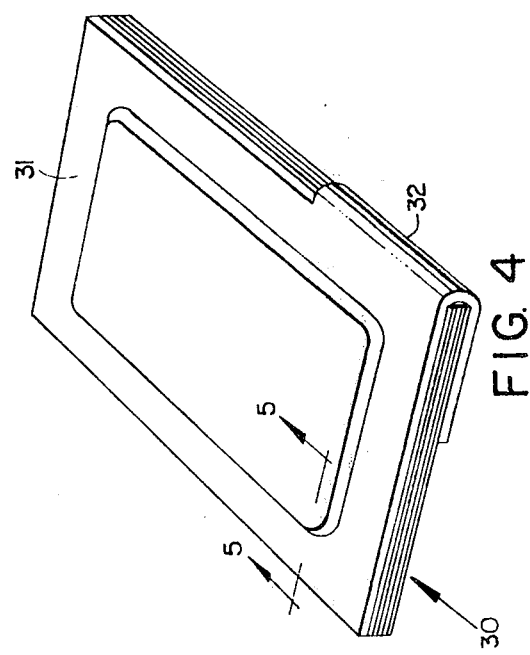
FIG. 4 is a schematic perspective sketch illustrating the external appearance of a battery made in accordance with the invention.

Referring to FIG. 4, showing a completed battery 30, final steps include the application of an anode terminal assembly generally designated 13, in the manner described in U.S. Pat. No. 4,019,251, which is preferably provided with an anode flap 32 folded around to the other side of the battery and suitably insulated from the cathode in the manner and for the purposes described in copending U.S. application for Letters Patent Ser. No. 782,836, filed on Mar. 30, 1977 by Albert L. Hyland and Robert G. Keene for Laminar Batteries and assigned to the assignee of this application, now U.S. Pat. No. 4,086,399.

FIG. 5 shows an enlarged cross section through such a battery 30 with the corresponding cell components being given the suffixes a, b, c and d to distinguish the several cells. As indicated in FIG. 5, as the first frame 8a is pressed down over the cathode assembly comprising the conductive plastic sheet 15 and its cathode slurry layer 16a, the cellophane separator 10a is deformed upward to follow the cathode slurry as the adhesive side 2a of the frame 8a is pressed into engagement with the conductive plastic 15. Typical dimensions in thickness for the components are about 5 mils for the carrier web 12, 2 mils for the steel or aluminum terminal 14, 2 mils for the conductive plastic layer 15, 2 mils for the adhesive layer 2a, and 8 mils for the vinyl frame portion 3a. During sealing, heat may be preferentially supplied by the upper platen 19 in FIG. 3. Alternatively, as the central region of platen 18 is arranged to be cooled, as with chilled water, and the outer periphery of the platen heated, a more efficacious approach would be to heat the assembly from the carrier web side, so that the surface of the adhesive layer 2a engaging the conductive plastic layer 15 would be hotter than the side adjacent the frame element 3a. The reason for cooling the central region of the battery during this operation is to dissipate heat conducted laterally through the metal terminal sheet 14.

Referring to FIG. 5, after the first layer 20a of gel electrolyte has been extruded into place in the pocket formed in the opening in the frame 8a, and the conductive plastic intercell connector 22a with its anode 23a has been put in place, it will be seen that a more efficacious heat transfer situation is provided when the upper platen 24 in FIG. 3 is heated and lower platen 25 is not heated, or is cooled. Preferably, as described above, the central region of the upper platen 24 is also cooled. The hot surface of the platen engaging the upper surface of the conductive plastic intercell connector 22a is now only 2 mils away from the upper side of the frame element 3a where the desired sealing surface exists. Thus, the conductive plastic layer 22a may be heated to a sealing condition without bringing the bulk of the frame 3a near its softening condition.

The situation is somewhat different when the second and subsequent frames such as 8b are added. Considering the frame 8b, when it is put in place it is desirable to heat the outer periphery of the upper platen such as 19 in FIG. 3 while cooling the central region, and not to heat the lower platen such as 18. The reason is a materially shorter heat transfer path between the upper surface of the frame element 3b, and the desired sealing interface with the adhesive layer 2b and the conductive plastic layer 22a. As a final sealing operation, with the frame 8d in place and the anode terminal assembly 31 in position, the heated upper platen such as 24 in FIG. 3 is employed against the anode collector 31. As shown in FIG. 5, the anode terminal subassembly comprises a conductive plastic layer 33 on which an anode 23d is applied. The conductive plastic layer 33 is laminated to a steel or aluminum anode terminal 34. A glassine overwrap may also be employed, as described in the above cited U.S. Pat. No. 4,019,251.

While the invention has been described with respect to the details of various illustrative and preferred embodiments and practices, many changes and variations will occur to those skilled in the art upon reading this description, and such can obviously be made without departing from the scope of the invention.

Having thus described the invention, what is claimed is:

1. In the process of making a laminar battery, the steps of extruding a slurry electrode onto a central region of the surface of a conductive plastic substrate, adhering a separator to a first side of a laminated frame of larger area than the separator and formed with a central opening adapted to register with and receive said electrode with the separator extending over said opening and beyond the border of said opening and the frame having border portions extending beyond the border of the separator, said frame being a laminate of two heat activatable thermoplastic adhesive materials, a first of said materials on said first side of the frame being adhesively activatable at a first temperature below the temperature at which a second of said materials is adhesively activatable under the same conditions of applied pressure and duration of heating, said separator being adhered to said first side of said frame by heat and pressure for a time sufficient to activate said first material but not said second material, placing said frame and said separator adhered thereto over said electrode and conductive plastic substrate with said electrode within said opening and said separator in registry and in contact with said electrode and extending beyond the borders of said electrode and said first side of said frame being in contact with said conductive plastic substrate beyond the borders of said separator, and adhering said frame to said conductive plastic by the application of heat and pressure for a time sufficient to activate said first material but not said second material.

2. The process of claim 1, further comprising the steps of extruding a quantity of gel electrolyte into the opening in said frame over the separator, placing a conductive plastic intercell conductor having a second electrode formed over a central region of a first surface thereof corresponding in size and shape to said slurry electrode over said frame with said first side of said intercell connector in contact with said second material of said frame and said second electrode in contact with said gel electrolyte, and adhering said intercell connector to said frame by heating said intercell connector under pressure to a temperature sufficient to bond said intercell connector to said frame while maintaining said first side of said frame below the temperature at which said first material would flow.

* * * * *